March 4, 1952
F. POPE
2,587,649
SELECTIVE TURBOPROPELLER JET
POWER PLANT FOR AIRCRAFT
Filed Oct. 18, 1946
2 SHEETS—SHEET 1
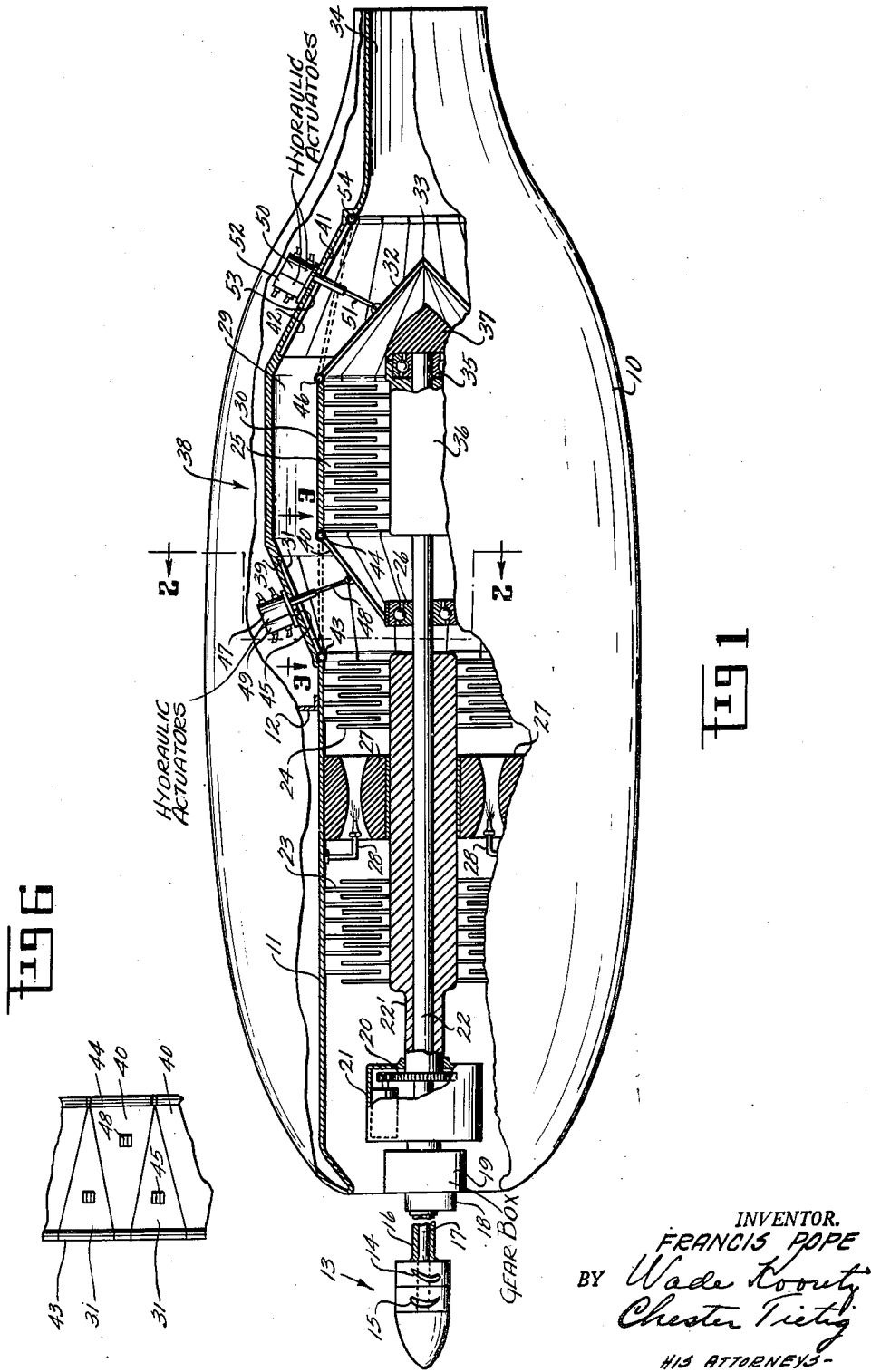
INVENTOR.
FRANCIS POPE
BY Wade Koontz
Chester Tietig
HIS ATTORNEYS-

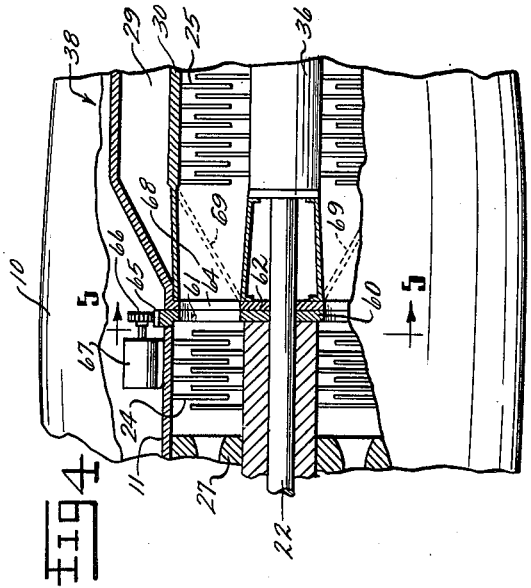

Patented Mar. 4, 1952

2,587,649

UNITED STATES PATENT OFFICE 2,587,649

SELECTIVE TURBOPROPELLER JET POWER PLANT FOR AIRCRAFT

Francis Pope, Bayside, N. Y.

Application October 18, 1946, Serial No. 703,981

8 Claims. (Cl. 60—35.6)

(Granted under the act of March 3, 1883, as amended April 30, 1928; 370 O. G. 757)

The invention described herein may be manufactured and used by or for the Government for governmental purposes without payment to me of any royalty thereon.

This invention relates to a power plant for aircraft. This power plant combines the characteristics and advantages of conventional propeller or airscrew propulsion with those of gas turbine and jet propulsion.

One object of the invention is to provide a power plant which will propel an aircraft during takeoff and climb by means of an airscrew driven by a gas turbine and, when high altitude has been reached, to propel the craft by direct jet propulsion.

Other objects are the promotion of high efficiency, versatility, and comparatively light weight in a power plant of this character. Until the present, no power plant has been known in which the selectivity offered by this invention was provided.

It is well known that jet propulsion is inefficient in regard to fuel consumption at low altitudes and that airscrew propulsion has the same objection at high altitudes. Present day proposals for solving the problem thereby presented comprise airscrew-gas turbine-reduction gearing combinations with these elements connected together.

My invention differs from the above gas turbine plant and also from the conventional jet plant in that I provide two turbines, one of just sufficient capacity to drive an air compressor and the conventional accessories and a second turbine arranged to absorb the maximum amount of residual energy from the gas flow generated in the first turbine. The power output of the second turbine is applied to the airscrew through a reduction gear. The invention provides that when the airscrew is feathered and the second tubine is bypassed by the hot gases, these elements will cease to function and the first turbine will deliver hot gases for direct jet propulsion.

Referring now to the accompanying drawings,

Fig. 1 is a longitudinal elevation, the housing being partly broken away to show a longitudinal section of the main portions of the power plant.

Fig. 2 is a cross section taken on the irregular line 2—2 of Fig. 1.

Fig. 3 is a view showing a portion of the deflector unit in Fig. 1 when the unit is closed, said section being taken on the line 3—3 of Fig. 1.

Fig. 4 is a partial view corresponding to the middle of Fig. 1 and illustrates an alternative to the deflectors shown in that figure.

Fig. 5 is a cross section taken on the line 5—5 of Fig. 4 and also illustrates the alternative to the deflectors.

Fig. 6 is a fragmentary view of the louvers fitted together on the left hand dotted line in Fig. 1.

In Figs. 1 and 4, 10 is a streamlined housing in which the power plant is mounted. The latter contains within it an inner housing 11 which is attached to the outer housing 10 by a multiplicity of struts similar to strut 12. At the forward or left end of the plant as shown in Fig. 1, there is a double counter-rotating propeller or airscrew of which the first portion 14 is adapted for counterclockwise rotation and the second portion 15 adapted for clockwise rotation, viewed from the right hand side. An inner shaft 17 drives portion 15 and a concentric outer shaft 16 drives portion 14. The double shaft 16—17 is driven by a gear box 19 through bearing 18.

The accessories box or housing 21 contains a number of accessories such as a fuel pump, generator, etc. These units are driven by a gear 20 attached to the external shaft 22'. Extending rearwardly or to the right and centrally through the housings 10 and 11, there is a single shaft 22 which carries the rotors of an axial flow air compressor 23, gas turbine 24 and a second gas turbine 25 which can be placed in adjustment to utilize hot exhaust gases from turbine 24. The shaft 22 is rotatably supported on a ball or other antifriction bearing 26.

Between the centrifugal compressor 23 and gas turbine 24 there is a belt of Venturi-throated burner passages 27 in each of which there is a fuel injection nozzle 28. At the region of the turbine 25, the housing 11 makes an outward general curve 38 and thereby defines a passageway 29 which may be selectively traversed by the hot exhaust gases from turbine 24. Turbine 25 has a shell 30 from which a nearly circular arrangement of deflector plates 40 extends to the outer shell of the bearing 26. A rear set of deflector plates 32 closes to a point 33. These elements define the inner wall of passageway 29 which terminates in a jet pipe 34, the latter being conventional.

The shaft 22 is also provided with a rear ball bearing 35 which is encased in a rotor 36. A streamline tailpiece 37 terminates rotor 36, thereby with deflectors 32 providing a streamline passage to the jet pipe 34 when deflectors 32 are open.

Also shown in Fig. 3 on the first rising slope of generally curved or expanded portion 38 which is more accurately a trapezoid, there is an annular arrangement of internal recesses 39 in which an arrangement of deflectors 31 fit closely. At the falling slope of the curved portion there is a similar arrangement of recesses 41, also containing deflectors 42. Deflectors 31 are hinged at 43 and deflectors 42 at 54. Likewise deflectors 40 are hinged at 44 and deflectors 32 at 46. It will be evident therefore that the outer sets of deflectors, if of triangular shape, and the inner set if trapezoidal, will be able to mesh. Such shape has been provided and the meshing effect can be seen from inspection of Fig. 6, which shows the deflectors opened so that each set occupies the position shown by the dashed lines in Fig. 1. A certain amount of overlap may be provided to insure gas-tightness.

Actuating means to open or close the deflectors may be either electrical or hydraulic. In Fig. 1, 47 is a hydraulic actuator controlling the compound piston rod 48 which is pivoted to the deflectors 40. Behind actuator 47 may be seen a second actuator 49 which is similarly connected to forward deflectors 31 by means of a rod 45. The rear deflectors 32 are similarly controlled by actuator 50 acting through piston rod 51. Behind the actuator 50 there is a second actuator 52 which similarly controls the deflectors 42 by means of a rod 53.

In operation, compressor 23 furnishes compressed air which is delivered through the Venturi throats 27 to burn fuel from the nozzles 28. The products of combustion actuate the turbine 24. Assuming that the deflectors 31—40 and 32—42 are in the position shown by the dashed lines, and in Fig. 6 in solid lines, the exhaust from turbine 24 passes through turbine 25 where it contributes more work to the turning of shaft 22 and the propellers indicated at 13.

The characteristics of the power plant are now suitable for takeoff and climb. After altitude has been attained, the hydraulic actuators 49—47 and 52—50 are energized to return the deflectors to the positions shown in Figs. 1 and 2. Piston rods 48—45—51 and 53 are of the telescopic variety so that the lower portion retracts into the upper and then the combined rods are retracted into the cylinder of the actuator. The exhaust from turbine 24 now flows in a curve over the shell 30 of turbine 25 and over the deflectors 40—32 to the jet pipe 34 and the atmosphere. This condition of the power plant is suitable for high altitude cruising.

As will be seen by Figs. 4 and 5, a different valve arrangement may be substituted in part for the deflectors. While I have here illustrated a rotary valve, it is to be understood that still other valve means may be substituted partially or wholly as the full equivalent of these elements of my disclosure without departing from the spirit of the invention.

In Figs. 4 and 5, with special reference to Fig. 5, a rotatable plate 60 is provided with four openings 61. Immediately behind the plate 60 is a stationary plate 62 having eight openings 64 registrable with those of plate 60. The openings not in use are shown in dashed lines. The rotatable plate 60 is provided with a geared periphery 65, a pinion 66 to mesh and an electric motor 67 to actuate the pinion. From the stationary plate 62 as will be seen in Fig. 4, eight tubes extend aft and each registers with one of the openings 61 or 64. The tubes 68, of which there are four, are arranged to deliver hot exhaust gases from the turbine 24, directly into the turbine 25. The tubes 69, of which there are also four, are indicated by dashed lines in Fig. 4. They are arranged alternately with tubes 68. It will be evident, therefore, that if one set of tube entrances, i. e., four tubes 69 are closed by the rotatable plate 60, the exhaust from turbine 24 will flow through tubes 68 to turbine 25. If tubes 69 are open, then the exhaust gases will flow around the turbine 25 and out of jet pipe 34.

The invention claimed is:
1. In a power plant, a central drive shaft and, arranged thereon in the order named, a propeller, a reduction gear for said propeller, an air compressor, a first turbine to drive said compressor and a second turbine to drive said propeller, a shell enclosing the foregoing elements except the propeller, a plurality of combustion chambers arranged about said drive shaft but not rotatable therewith, between the air compressor and the first turbine, at least one fuel-feeding nozzle in each of said combustion chambers, said shell having an expanded portion defining an annular passage about said second turbine whereby to provide a bypass for exhaust gases from said first turbine around said second turbine and valve means surrounding said circular drive shaft within said shell for selectively directing substantially the entire output of the exhaust gases from said first turbine either through or around said second turbine, and a jet pipe from which said exhaust gases may vent to the atmosphere directly from said first turbine.

2. In a power plant, a central drive shaft and, arranged on said shaft in the order named, a propeller, a reduction gear for said propeller, an air compressor, a first turbine to drive said compressor and a second turbine, a plurality of combustion chambers arranged about said drive shaft but not rotatable therewith, between the air compressors and the first turbine, at least one fuel-feeding nozzle in each of said combustion chambers, a shell enclosing the foregoing elements except the propeller, said shell having an expanded portion about said second turbine whereby to provide a bypass for exhaust gases from said first turbine around said second turbine, and valve means disposed on the shell and on the second turbine both substantially at the beginning and end of said expanded portion of said shell whereby upon suitable adjustment of said valve means the exhaust gases from the first turbine may be directed into the second turbine or around it and substantially directly out of the rear end of said shell, and a jet from which said exhaust gases may vent to the atmosphere directly from the first turbine.

3. A power plant according to claim 2 in which the valve means comprises upper and lower deflectors, means to actuate same, said lower deflectors being adapted to mesh with said upper deflectors when in position to direct the exhaust gases from the first turbine into the second turbine.

4. In a power plant, a central drive shaft and, arranged on said shaft in the order named, a propeller, a reduction gear for said propeller, a centrifugal air compressor, a first turbine to drive said compressor and a second turbine, a plurality of combustion chambers arranged about said drive shaft but not rotatable therewith, between the air compressor and the first turbine, at least one fuel-feeding nozzle in each of said combustion chambers, a shell enclosing the foregoing elements except the propeller, said shell having an expanded portion about the second turbine whereby to provide a bypass for exhaust gases from said first turbine around said second turbine and a jet pipe at the rear of said shell, two sets of tubes alternately arranged within said shell longitudinally thereof, one set being directed from the exhaust of said first turbine into the intake of said second turbine, the other set being arranged from the exhaust of said first turbine into the bypass around the second turbine, valve means within said shell substantially at the entrances to said tubes and power means for selectively adjusting said valve means to deliver exhaust gases into one set of tubes or the other whereby to drive said propeller by the second turbine or to propel the power plant by the jet action of the hot gases flowing out of the jet pipe at the rear of said shell, directly from said first turbine.

5. A power plant according to claim 4 in which the valve means comprises a pair of circular plates, one plate being stationary and the other plate rotatable, said plates having registrable openings which are also registrable with one set of said tubes at any one time there being half as many openings in the rotatable plate as in the stationary one, said valve means being located within the shell between the first and second turbines.

6. In an aircraft power plant, a central drive shaft and arranged thereon in the order named, a propeller, a reduction gear to be driven by said shaft and to drive said propeller, an axial flow air compressor, a first turbine to drive said compressor and a second turbine to drive said propeller, a shell enclosing all of the foregoing elements except the propeller, an expanded portion in said shell at the region in which the second turbine is enclosed, said expanded portion forming a bypass around the second turbine, a jet pipe at the rear of said shell, a plurality of oil injection pipes disposed forward of the first turbine and Venturi means cooperating with said pipes to feed products of combustion to said first turbine, an annular assembly of deflector plates before said second turbine said assembly comprising upper and lower oppositely facing triangular plates, a similar assembly immediatley aft of said second turbine, power means to bring each upper assembly into mesh with its corresponding lower assembly whereby the bypass around the second turbine may be closed to direct products of combustion from the first turbine into the second turbine, said power means being also operative to return the deflectors to their original positions.

7. An aircraft power plant according to claim 6 in which the power means for meshing the deflectors and returning them to position is a plurality of hydraulic actuators, said actuators being each provided with a telescopic piston rod, each rod being connected to a deflector.

8. In an aircraft power plant, a propeller, rotary air compressing means, a first turbine, fuel combustion means between said air compressing means and said first turbine, a second turbine, the propeller drivably connected to one of said turbines, said air compressing means being driven by the other of said turbines, an inner shell enclosing said elements except the propeller, said shell being spaced from said elements and terminating in a jet pipe, an expanded portion of said inner shell spaced from said second turbine to provide a by-pass from said first turbine and second turbine to said jet pipe, means for selectively directing the entire output of exhaust gases from said first turbine into the second turbine or through the by-pass directly into the tail pipe, whereby to convert the power plant from a condition suitable for high altitude cruising which prevails when the entire output of exhaust gases flows directly into the tail pipe through the by-pass, to a condition suitable for take-off and climb as occurs when the exhaust gases are flowing through the second turbine, and vice versa, and an outer shell enclosing all of the foregoing elements except the propeller and as much as the drive shaft as is necessary to project beyond the outer shell to drive said propeller.

FRANCIS POPE.

REFERENCES CITED

The following references are of record in the file of this patent:

UNITED STATES PATENTS

| Number | Name | Date |
| --- | --- | --- |
| 1,959,795 | Lysholm | May 22, 1934 |
| 2,243,467 | Jendrassik | May 27, 1941 |
| 2,280,835 | Lysholm | Apr. 28, 1942 |
| 2,409,176 | Allen | Oct. 15, 1946 |
| 2,435,836 | Johnson | Feb. 10, 1948 |

FOREIGN PATENTS

| Number | Country | Date |
| --- | --- | --- |
| 541,307 | Great Britain | Nov. 21, 1941 |
| 562,251 | Great Britain | June 23, 1944 |
| 576,094 | Great Britain | Mar. 19, 1946 |